United States Patent [19]

Secord, deceased et al.

[11] 4,374,478

[45] Feb. 22, 1983

[54] STORAGE TANKS FOR LIQUIDS

[75] Inventors: Herbert C. Secord, deceased, late of Siena, Italy; by Fanny E. P. Secord, executor, London, United Kingdom

[73] Assignee: Ocean Phoenix Holdings NV, Curacao, Netherlands Antilles

[21] Appl. No.: 109,203

[22] Filed: Jan. 3, 1980

[30] Foreign Application Priority Data

Jan. 11, 1979 [GB] United Kingdom ................. 7900987
Sep. 2, 1979 [GB] United Kingdom ................. 7938108

[51] Int. Cl.[3] ...................... G01M 3/00; B65D 90/00; B65D 6/00

[52] U.S. Cl. ................................ 73/863.31; 73/49.2; 220/1 B; 220/5 A; 220/18; 220/71; 220/426; 220/445; 137/259

[58] Field of Search ..................... 220/3, 22, 901, 1 B, 220/445, 71, 5 A, 18; 137/266, 259; 405/55; 73/863.31, 49.2

[56] References Cited

U.S. PATENT DOCUMENTS

| | | | |
|---|---|---|---|
| 2,341,044 | 2/1944 | Jackson et al. | 220/3 |
| 3,092,063 | 6/1963 | LeRoux | 220/445 X |
| 3,314,567 | 4/1967 | Becker et al. | 220/71 |
| 3,472,414 | 10/1969 | Rodrigues | 220/3 |
| 3,528,582 | 9/1970 | Rigollot | 220/3 |
| 3,659,543 | 5/1972 | Basile et al. | 220/901X |
| 3,952,531 | 4/1976 | Turner | 405/55 X |
| 4,136,493 | 1/1979 | Bradford | 405/55 X |

FOREIGN PATENT DOCUMENTS

| | | | |
|---|---|---|---|
| 1037900 | 9/1953 | France | 220/1 B |
| 2290367 | 6/1976 | France | 220/1 B |
| 1409265 | 10/1975 | United Kingdom | 220/901 |

*Primary Examiner*—Alan Cohan
*Assistant Examiner*—John A. Rivell
*Attorney, Agent, or Firm*—Strimbeck, Davis & Soloway

[57] ABSTRACT

The invention relates to tanks for the storage of liquid and has particular application to the land storage of liquefied gas at low temperature at or above atmospheric pressure. Thus, the invention provides a storage tank of the kind in which the walls are formed by a multiplicity of connected, parallel, part-cylindrical lobes presenting outwardly convex arcuate surfaces, which is characterized in that the side and end walls thereof are provided by a single tier of connected lobes, in that said lobes extend in one common direction over the tank, in that the end walls of the tank comprise part-spherical knuckles closing off the ends of the part-cylindrical lobes, and in that a separating plate is provided at each lobe connection to strengthen the tank against internal pressure and to divide it into separate storage compartments.

2 Claims, 3 Drawing Figures

STORAGE TANKS FOR LIQUIDS

The invention relates to tanks for the storage of liquids and has particular application to land storage tanks for the storage of gases such as natural gas, petroleum gas, ethane/ethylene and noxious gases such as ammonia and chlorine, liquefied at or below ambient temperature and at or above atmospheric pressure.

In U.K. Patent No. 1 522 609 and U.K. Patent Application No. 37247/76 there are described tanks of lobed design, particularly for use in ships or barges for the overwater bulk transportation of liquefied gas.

Due to the shape of the hull of the ship or barge, for economy of cost and space, it is desirable to provide tanks which are more or less prismatic, whilst from the point of view of effectiveness of containment the container walls should be primarily in tension rather than in bending.

To this end a tank design is described and claimed in U.S. Pat. No. 1 522 609, which is provided with a multiplicity of lobes which are interconnected longitudinally and vertically by a suitable support framework so that the overall shape of the finished lobed tank is generally prismatic, whilst U.S. patent application No. 37247/76 describes an improved support arrangement therefor.

Because the present invention is particularly intended for land storage, the restrictions imposed on tank dimensions by the shape of the hull of a ship or barge are not of importance and, it is an object of this invention, to provide a lobed tank arrangement particularly suitable for land storage.

According to this invention there is provided a storage tank for the storage of liquid at or above atmospheric pressure, of the kind in which the walls are formed by a multiplicity of connected, parallel, part-cylindrical lobes presenting outwardly convex arcuate surfaces, characterised in that the side and end walls thereof are provided by a single tier of connected lobes, in that said lobes extend in one common direction over the tank, in that the end walls of the tank comprise part-spherical knuckles closing off the ends of the part-cylindrical lobes, and in that a separating plate is provided at each lobe connection to strengthen the tank against internal pressure, one or more of said plates being liquid tight so as to divide the tank into separate storage compartments.

Preferably, the connection between each adjacent pair of lobes is provided by welding to two arms of a generally "Y"-shaped insert, the third arm extending inwardly from its respective tank wall and projecting into the tank interior, each separating plate being welded around its periphery to said third arm of its respective said insert.

Figures 1, 2:
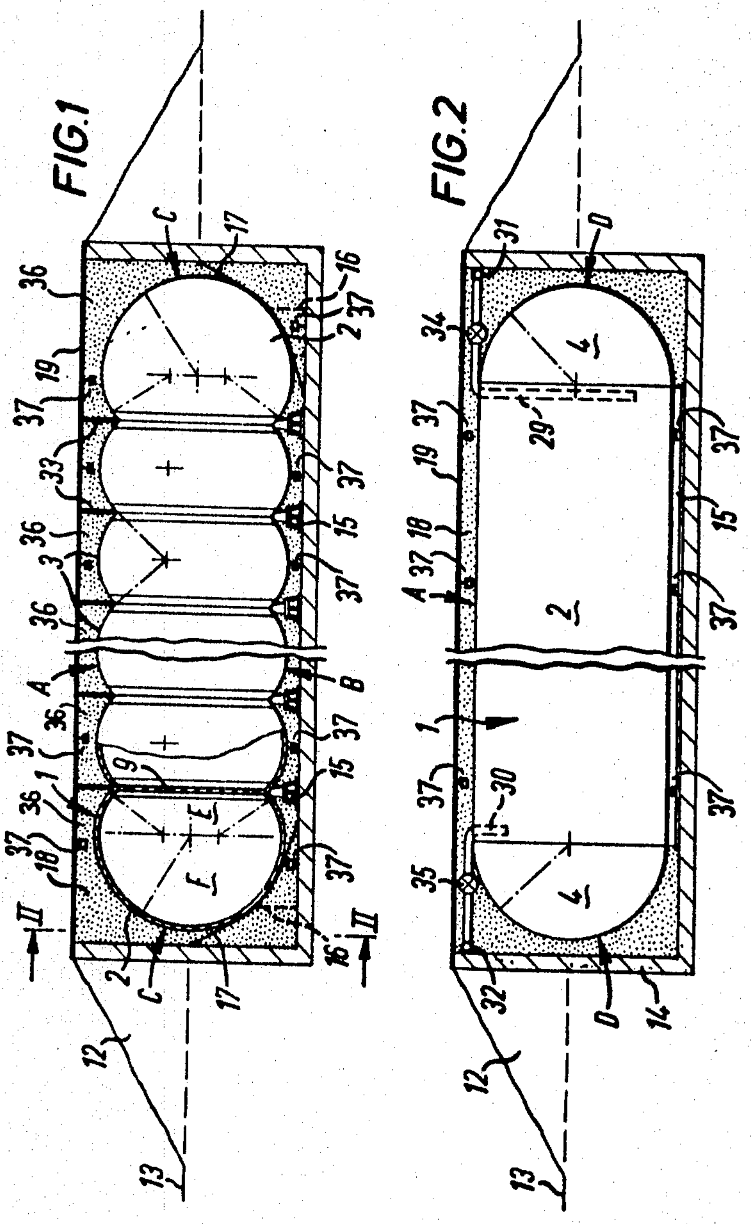
Figure 3:
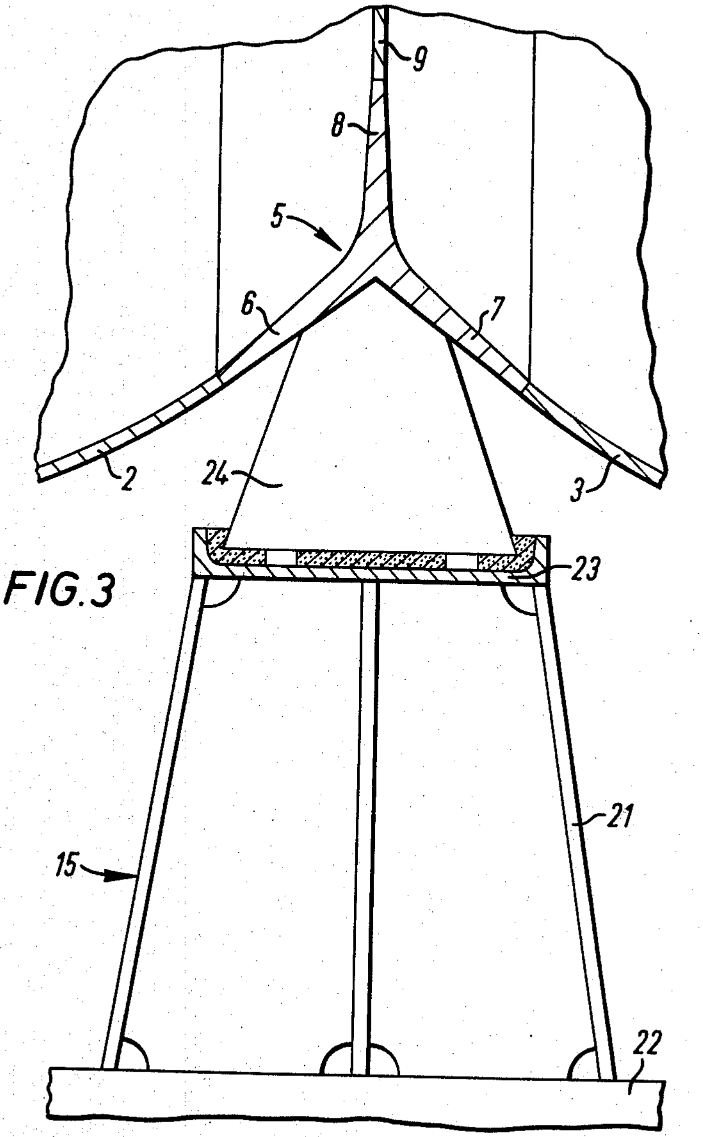

In order that the invention may be readily understood, and further features made apparent, one exemplary embodiment constructed in accordance therewith will now be described with reference to the accompanying drawings in which:

FIG. 1 is a fragmentary part-sectional longitudinal elevation of the storage tank, FIG. 2 is a view on the line II—II of FIG. 1, and FIG. 3 is an enlarged view showing a node point of the tank in cross-section and a tank support.

Referring to the drawings, the tank 1 is square or rectangular in plan and is intended for the bulk storage of liquefied natural gas (LNG) at a pressure of 1 to 10 atmospheres absolute.

The tank 1 is made of a steel which is not embrittled by the very low temperature, e.g. 9% nickel steel, or stainless steel, or an appropriate aluminium alloy, and comprises top, bottom, side and end walls A,B,C and D respectively consisting of a multiplicity of outwardly convex, part-cylindrical parallel lobes 2, 3 connected together to extend along the length of the tank. The overall plan dimensions can be varied to suit the site on which the tank is to be built and can be square in plan or its longitudinal or transverse dimension can be made significantly greater by increasing the length of the lobes 2 and 3, or respectively by constructing the tank with a greater number of intermediate lobes 3. Thus, in accordance with this invention, only one tier of lobes is provided, thereby eliminating any need to provide a framework, plates, or the like to connect lobes horizontally. The two side wall lobes C, in cross-section (see FIG. 1), each have an arc of about 270°, whilst each intermediate lobe 3 has top and bottom wall arcs of about 90° emanating from two centres offset from the median horizontal plane of the tank. The end walls D of the tank are composed of part-spherical knuckles 4 which close-off the ends of the longitudinally extending lobes 2 and 3. The lobes 3 and the knuckles 4, in their transverse direction, each have the same radius of curvature; the chord length of each of the intermediate lobes 3 is thus the same, so that they can each be made as a modular construction. Over the height of each knuckle 4, the vertical radius of curvature may be equal to or greater than their transverse radius of curvature. With regard to the side lobes 2, referring to the left-hand lobe in FIG. 1, the right-hand part referenced E is equivalent to half an intermediate lobe 3, whilst its left-hand part, referenced F, has a vertical radius of curvature which is equal to the vertical radius of curvature of the knuckle 4 at its vertical centre-line.

Referring now particularly to FIG. 3, at the intersection lines of the lobes, i.e. the "nodes" between adjacent lobe arcs, three-armed insert rings 5 of generally Y-cross-section are used for the welded joints between said lobe arcs. As shown, the arms 6 and 7 of the insert ring 5 are appropriately spaced to be in alignment with respective edges of the top and bottom lobes 2, 3 and the edges of the knuckles 4, and the parts are butt-welded together. Also, the third arm 8 of the insert ring extends perpendicular to its respective tank wall so as to project inwardly into the tank interior. An important feature of this invention is that each insert ring 5 supports a plate 9, the plate being butt-welded around its periphery to the free edge of the arm 8 of the insert ring. Thus, the plates 9 perform the functions of providing internal ties for the tank, particularly against tension forces, supporting the tank when empty and providing separating walls between the lobes 2, 3 to produce separate storage compartments or cells over the width of the tank.

Referring again to FIGS. 1 and 2, it can be readily seen that the tank provides a low profile. For safety reasons, it is very desirable for any land storage tank to be sited within a containing dyke at least partly below ground level. As shown, the dyke is provided by an excavated lower part and an upper part which is built up above ground level 13 by the excavated soil 12. The dyke is defined by re-inforced concrete side and end walls 14 and the tank 1 is constructed progressively within the dyke; it will be appreciated here that construction is simplified particularly by the use of intermediate lobes 3 of modular construction. Also, the required storage volume can be readily obtained by the provision of a dyke of a length and width such as to accomodate an appropriate number of end and intermediate lobes 2,3 of a predetermined length.

The lobes 2, 3 of the tank, in this embodiment, are supported by longitudinally extending bottom support brackets 15 provided one along each node between the lobe bottom arcs. These support brackets are described in more detail hereinafter, Also, to prevent the end lobes 2 sagging, particularly when the tank is not pressurised, support straps 17 extend from the adjacent side wall 14 to the foundation as shown in FIG. 1. Alternatively, a rigid foamed glass support block (shown dotted at 16) having an appropriately concave-shaped upper surface can be provided.

To provide the necessary thermal insulating effect, the space between the tank and the dyke is filled with insulating material 18, which is of a thickness and quality to maintain the gas in its liquid state with a controlled, relatively small amount of pressure rise. A suitable material for use would be perlite.

It is necessary to protect the insulation from the weather and to provide an enclosed space around the tank which can be maintained in an inert condition, e.g. by the use of nitrogen. This is achieved by providing a roof 19 which is sealed to the dyke walls. It is important that the roof 19 be sufficiently strong to withstand the elements; to achieve this with a roof of relatively light construction, said roof is provided with feet 33 which rest on the tank top nodes. This enables a large span for the roof to be achieved.

Conveniently, in order to provide for an early indication and location of a gas leak, the space between the tank and dyke can be partitioned at the nodes and in each partitioned area (36) a ring of sniffers (37) may be located around the tank. This enables nitrogen from each partitioned area to be sampled separately by appropriate meters to identify any particular leaking tank compartment.

Referring again to FIG. 3, each tank bottom support bracket 15 is similar to that described in British patent application No. 37247/76 and comprises a pedestal structure 21 which is rigidly mounted on a re-inforced concrete plinth 22 and has a tray-like saddle 23 at the top on which rests an upwardly-tapering block 24 of resin-impregnated wood laminate, or hardwood, which material is both load bearing and heat-insulating. As mentioned hereinbefore, these support brackets extend longitudinally of the tank at spaced transverse positions corresponding to the node positions between the lobe bottom arcs.

In a practical example of said tank, intended to contain 230,000 $m^3$ of LNG at a gas pressure of up to 50 p.s.i.g., the overall size of the tank would be approximately 128 meters long, 128 meters wide and 16 meters deep, the vertical radius of curvature of the arcs of the side lobes and the end knuckles 4 being 8 meters and the transverse radius of curvature of the top and bottom lobes and the end knuckles 4 being approximately 5.7 meters. The spacing of the separating plates 9 within the tank 1 would also be 8 meters.

The insulation e.g. of perlite, would preferably provide a mean insulation thickness of approximately 1 meter, which would result in a controlled pressure rise of less than 1 p.s.i/week (i.e. equivalent to a boil-off of less than 0.05%/day of the storage volume).

As mentioned hereinbefore, a feature of this tank is its low profile which enables it to be economically located substantially or wholly below ground. Also, the design is such that the tank is flexible transversely and slidable longitudinally to absorb thermal contraction/expansion in use.

A further important feature of the tank is the provision of the dual purpose separating plates 9, since not only do they ensure a rigid integrated structure for the tank (i.e. to strengthen the tank against internal pressure and to support it when empty) but, due to the fact that they effectively divide up the tank into separate storage compartments, the safety of the tank is enhanced. Thus, any fracture will be restricted to a single storage compartment, and will result in leakage of LNG only from that compartment. In use, each storage compartment may be left with an ullage space when the tank is filled, so that should a storage compartment leak for any reason, the LNG in this compartment can readily be either preferentially discharged into associated vapourisation plant, or flared, or accommodated in the ullage spaces of the other compartments using the gas and liquid loading discharging pipework described below. After the transfer operation it may be necessary e.g. if the gas leak is excessive, to depressurise the leaking compartment. This will cause a large pressure differential with the adjacent compartments, which can be accommodated by elastic dilation of the separating plates 9; thereby the integrity of the adjacent compartments can be preserved.

Because the tank is effectively divided up into separate compartments it is necessary to provide appropriate pipework and access to each compartment, as shown generally by the reference 29, 30 respectively, for liquid loading and discharge and adjustment of the gas pressure, each pipe being connected via an appropriate valve 34, 35 to a respective common liquid or gas header 31,32.

It will be appreciated that, in use, the liquid and gas valves are normally left open so that pressure in all of the compartments is equalised. Also, the valves enable a leaking compartment to be isolated and to transfer—by use of gas pressure-the liquid contained therein to the other compartments or, alternatively, into associated vaporisation plant.

It will also be appreciated that the tank's pressure capability is such that, during loading, ullage gas can be removed via the gas header 32 and recycled via the liquid header 31 thereby creating a pressure sufficient to force said gas into solution.

A further advantage of storing the liquefied gas under pressure is that loading and discharge of the liquid can be achieved via external ground level pumps. Thus, the pumps are easily accessible for inspection and maintenance.

I claim:

1. A land storage tank arrangement for the storage of fluid media under pressure, comprising an internal-pressure-sustaining insulatable tank of generally rectangular cross-section having a bottom wall, a top wall, two opposite longitudinal side walls and two opposite end walls; each of said bottom and top walls consisting of a multiplicity of equal-sized parallel lobes, and each said side wall consisting of one lobe, the side wall lobes also being equal-sized, all said lobes being of part-cylindrical form and being convex outwardly of the tank with the two inwardly-directly longitudinal edges of each lobe joined to a longitudinal edge of a lobe alongside; and said end walls consisting of a multiplicity of part spherical end wall elements having the same radius of curvature as said lobes and each joined at its inwardly directed edges to end wall elements alongside and to bottom, top and side wall lobes alongside to unite said bottom, top, side and end walls to one another; said insulatable tank further comprising a single series of parallel internal reinforcing plates, each plate extending from the joint between two lobes of the bottom wall to the respective opposite joint between two lobes of the top wall and extending longitudinally to the joints of opposed end wall elements to tie the tank end walls to one another longitudinally; said storage tank arrangement further comprising a shallow dyke in which the tank is sited at least partly below ground, said dyke having dyke walls being spaced from the tank by a space filled with a thermal insulating material and an inert gas atmosphere, a substantially flat roof which extends over the tank and is sealed to the dyke walls, and roof support means comprising feet spaced apart on the underside of the rood and sited so as to sit on the joints between adjacent lobes of the top wall or the tank whereby the span or the roof is supported by said insulatable tank.

2. A land storage tank arrangement for the storage of fluid media under pressure, comprising an internal-pressure-sustaining insulatable tank of generally rectangular cross-section having a bottom wall, a top wall, two opposite longitudinal side walls and two opposite end walls; each of said bottom and top walls consisting of a multiplicity of equal-sized parallel lobes, and each said side wall consisting of one lobe, the side wall lobes also being equal-sized, all said lobes being of part-cylindrical form and being convex outwardly of the tank with the two inwardly-directly longitudinal edges of each lobe joined to a longitudinal edge of a lobe alongside; and said end walls consisting of a multiplicity of part spherical end wall elements having the same radius of curvature as said lobes and each joined at its inwardly directed edges to end wall elements alongside and to bottom, top and side wall lobes alongside to unite said bottom, top, side and end walls to one another; said insulatable tank further comprising a single series of parallel internal reinforcing plates, each plate extending from the joint between two lobes of the bottom wall to the respective opposite joint between two lobes of the top wall and extending longitudinally to the joints of opposed end wall elements to tie the tank end walls to one another longitudinally; said storage tank arrangement further comprising a shallow dyke in which the tank is sited at least partly below ground, said dyke having dyke walls being spaced from the tank by a space filled with a thermal insulating material and an inert gas atmosphere, a substantially flat roof which extends over the tank and is sealed to the dyke walls, and roof support means comprising feet spaced apart on the underside of the roof and sited so as to sit on the joints between adjacent lobes of the top wall or the tank whereby the span or the roof is supported by said insulatable tank, wherein one or more of said internal reinforcing plates is liquid tight so as to divide the tank into separate storage compartments, said space is partitioned at positions corresponding to the liquid tight plates, and a ring of sniffers is located around the tank in each partitioned area, thereby enabling inert gas from each partitioned area to be sampled separately thereby to monitor its associated storage compartment of the tank for leaks.

* * * * *

UNITED STATES PATENT AND TRADEMARK OFFICE

CERTIFICATE OF CORRECTION

PATENT NO. : 4,374,478

DATED : February 22, 1983

INVENTOR(S) : Herbert C. Secord

It is certified that error appears in the above—identified patent and that said Letters Patent is hereby corrected as shown below:

Column 5, line 19: The term "roof" should be substituted for "rood".

Signed and Sealed this

*Tenth* Day of *May 1983*

[SEAL]

*Attest:*

GERALD J. MOSSINGHOFF

*Attesting Officer* *Commissioner of Patents and Trademarks*